United States Patent
Assael

(10) Patent No.: US 12,250,303 B2
(45) Date of Patent: Mar. 11, 2025

(54) PROTECTION OF A CRYPTOGRAPHIC OPERATION

(71) Applicant: STMICROELECTRONICS (ROUSSET) SAS, Rousset (FR)

(72) Inventor: Guilhem Assael, Pourrieres (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 39 days.

(21) Appl. No.: 17/820,843

(22) Filed: Aug. 18, 2022

(65) Prior Publication Data
US 2023/0074513 A1 Mar. 9, 2023

(30) Foreign Application Priority Data
Aug. 31, 2021 (FR) ...................................... 2109096

(51) Int. Cl.
*H04L 9/08* (2006.01)
*G06F 7/72* (2006.01)

(52) U.S. Cl.
CPC ............ *H04L 9/0877* (2013.01); *G06F 7/725* (2013.01)

(58) Field of Classification Search
CPC ..... H04L 9/0877; H04L 9/3066; H04L 9/003; H04L 9/08; G06F 7/725; G06F 21/755; G06F 2207/7219; G06F 2207/7257; G06F 2207/7266; G06F 2221/2123; G09C 1/00
See application file for complete search history.

(56) References Cited

U.S. PATENT DOCUMENTS

| | | | |
|---|---|---|---|
| 2008/0019509 A1* | 1/2008 | Al-Gahtani | H04L 9/3066 380/30 |
| 2012/0008780 A1 | 1/2012 | Al-Somani et al. | |
| 2015/0288520 A1* | 10/2015 | Jacobson | G06F 7/725 380/28 |

OTHER PUBLICATIONS

Abdulrahman et al., "New Regular Radix-8 Scheme for Elliptic Curve Scalar Multiplication without Pre-Computation," *IEEE Transactions On Computers* 64(2):438-451, Feb. 2015.
Elmegaard-Fessel, "Efficient Scalar Multiplication and Security against Power Analysis in Cryptosystems based on the NIST Elliptic Curves Over Prime Fields," Thesis for the Master degree in Mathematics, Institute for Mathematical Sciences, University of Copenhagen, Aug. 1, 2006. (201 pages).
Hitchcock et al., "A New Elliptic Curve Scalar Multiplication Algorithm to Resist Simple Power Analysis," In Batten et al. (eds.), vol. 2384 of Lecture Notes in Computer Science, Springer, *Information Security and Privacy*, ACISP 2002, Berlin, Heidelberg, 2002, pp. 214-225.

(Continued)

*Primary Examiner* — Quazi Farooqui
(74) *Attorney, Agent, or Firm* — Seed IP Law Group LLP

(57) ABSTRACT

The present disclosure relates to a cryptographic method comprising: multiplying a point belonging to a mathematical set with a group structure by a scalar by performing: the division of a scalar into a plurality of groups formed of a same number w of digits, w being greater than or equal to 2; and the execution, by a cryptographic circuit and for each group of digits, of a sequence of operations on point, the sequence of operations being identical for each group of digits, at least one of the operations executed for each of the groups of digits being a dummy operation.

26 Claims, 5 Drawing Sheets

(56) References Cited

OTHER PUBLICATIONS

Nascimento et al., "A comparison of simple side-channel analysis countermeasures for variable-base elliptic curve scalar multiplication," XIV Simpósio Brasileiro em Segurança da Informação e de Sistemas Computacionais—SBSeg 2014, pp. 125-138, 2014.

Pontie et al., "An Elliptic Curve Crypto-Processor Secured by Randomized Windows," 2014 17th Euromicro Conference on Digital System Design, Verona, Italy Aug. 27-29, 2014, pp. 535-542.

Pontie et al., "Dummy operations in scalar multiplication over elliptic curves: A tradeoff between security and performance." *Microprocessors and Microsystems* 47:23-36, 2016.

* cited by examiner

| KEY | 01 | 01 | 0 | 01 | 0 0 |
|---|---|---|---|---|---|
| PATTERN | DBL DBL ADD | DBL DBL ADD | DBL (DBL ADD) | DBL DBL ADD | DBL DBL (ADD) |

FIG. 3

PROTECTION OF A CRYPTOGRAPHIC OPERATION

BACKGROUND

Technical Field

The present disclosure generally concerns the field of cryptography and in particular the field of elliptic curve or similar cryptography.

Description of the Related Art

Elliptic curve cryptography (ECC) is well adapted to public key cryptography methods since it enables cipher keys of reduced size to be used.

However, an attack by simple power analysis (SPA), carried out during a cryptographic operation involving the cipher key, may enable an outer entity to deduce the value of the cipher key, in a cryptographic method based on elliptic curves, among others.

It is desirable to make the value of the cipher key difficult to detect during the execution, by an electronic device, of cryptographic operations involving it.

BRIEF SUMMARY

In an embodiment, a method comprises: multiplying, using cryptographic circuitry, a point, belonging to a mathematical set with a group structure, by a scalar; and protecting, using the cryptographic circuitry, the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation.

In an embodiment, a device comprises: a memory; and cryptographic circuitry coupled to the memory. The cryptographic circuitry, in operation, multiplies a point by a scalar, the point belonging to a mathematical set with a group structure, and protects the scalar during the multiplying, the multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation.

In an embodiment, a system comprises: a host processor; and a cryptographic coprocessor coupled to the host processor, wherein the cryptographic coprocessor, in operation, multiplies a point by a scalar, the point belonging to a mathematical set with a group structure, and protects the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation.

In an embodiment, a non-transitory computer-readable medium has contents which configure cryptographic circuitry to multiply a point by a scalar, the point belonging to a mathematical set with a group structure, and protect the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which:

FIG. 3 is a table showing an example of the insertion of dummy cryptographic operations;

DETAILED DESCRIPTION

Like features have been designated by like references in the various figures unless the context indicates otherwise. In particular, the structural and/or functional features that are common among the various embodiments may have the same references and may dispose identical or similar structural, dimensional and material properties.

For the sake of clarity, only the steps and elements that are useful for an understanding of the embodiments described herein have been illustrated and described in detail. In particular, the representations of a scalar in non-adjacent windowed form as well as the double, add, or Frobenius operations on elliptic curves, are not described in details.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Figure 1:
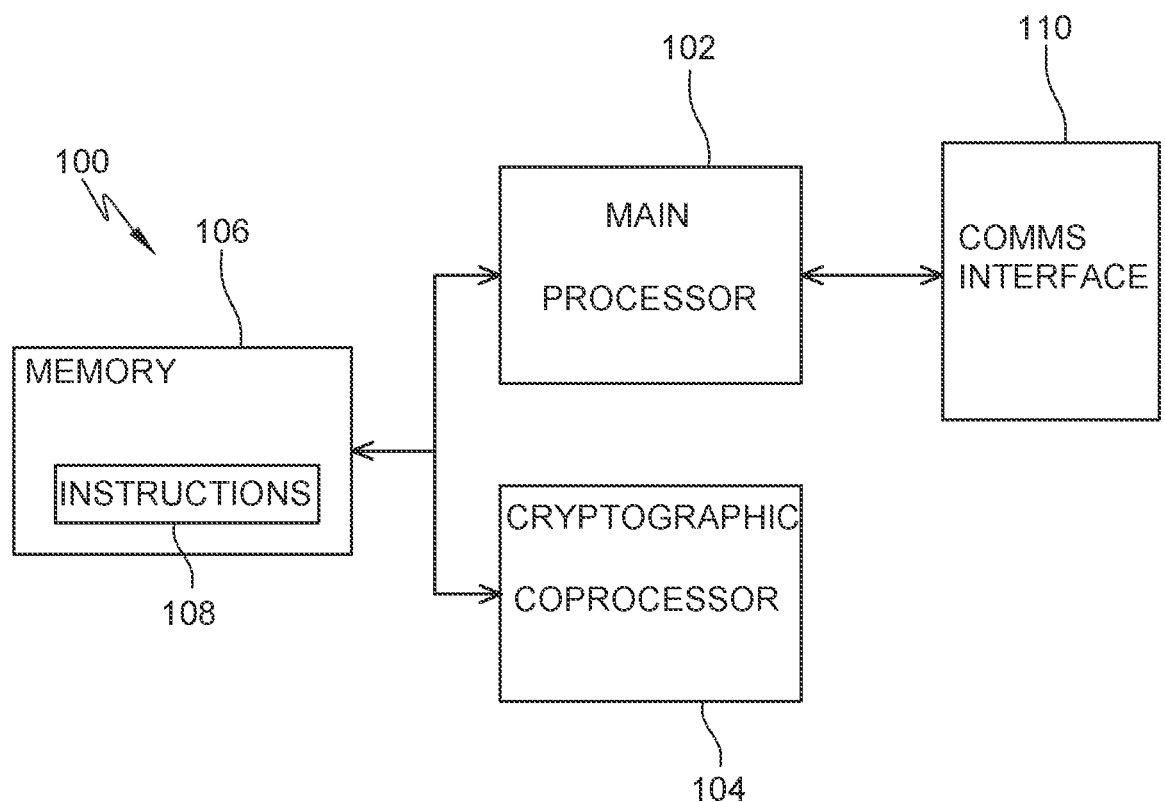
FIG. 1 schematically illustrates an example of an electronic device of the type to which the described embodiments may apply.

FIG. 1 schematically illustrates a device 100 according to an embodiment. Device 100 is for example a computer, a cell phone, or even an integrated circuit card.

Device 100 for example comprises a main processor 102 (MAIN PROCESSOR), which is for example a host processor or application processor of device 100, and a cryptographic coprocessor 104 (CRYPTOGRAPHIC COPROCESSOR). The main processor 102 may, for example, execute applications, which may invoke the cryptographic coprocessor 104, for example, as part on an authentication procedure. Device 100 further comprises a memory 106 (MEMORY) storing instructions 108 (INSTRUCTIONS) for controlling main processor 102 and cryptographic coprocessor 104. A communication interface 110 (COMMUNICATIONS INTERFACE) is for example coupled to main processor 102, and for example allows wireless communications via a wireless communication network, and/or wired communications, for example, over a LAN ("Local Area Network," not shown).

Device 100, and particularly cryptographic coprocessor 104, is for example adapted to perform elliptic curve cryptographic operations. In particular, cryptographic coprocessor 104 is for example configured to perform a multiplication by a scalar k of a point P belonging to an elliptic curve E having the following form:

$$E := \{(x,y) \in K \times K ; y^2 + a_1 xy + a_3 y = x^3 + a_2 x^2 + a_4 x + a_5\} \quad \text{[Math 1]}$$

Where K is finite field, for example K=Z/pZ K=Z/pZ, p being a prime number or a power of prime number and coefficients $a_1, a_2, a_3, a_4$ $a_1, a_2, a_3, a_4$ and $a_6$ belong to field K. In another example, point P belongs to a hyperelliptic curve, or to another type of curve or to any mathematical set having a group structure, for which addition and subtraction are efficiently computable in terms of computational complexity. One example of such a mathematical set is for example an Edwards curve.

This operation of multiplication by a scalar is for example used during the ciphering of data, scalar k being the cipher key, and is for example performed by the execution of an algorithm of "double-and-add" type. This type of algorithm is of iterative type and uses the bits of scalar k from the most significant to the least significant, or inversely, and performs an operation, on an initially zero current value Q, according to the value of the read bit. A so-called double operation (DBL) is performed whatever the value of the bit that is read, and is followed by a so-called add operation (ADD) only in the case where the read bit is non-null.

In the case where curve (E) is a Koblitz curve, having the following form:

$$E := \{(x,y) \in K \times K ; y^2 + xy = x^3 + ax^2 + 1\} \quad \text{[Math 2]}$$

with $a \in \{0,1\}$ $a \in \{0,1\}$, the double operation (DBL) is generally replaced with a Frobenius operation. A Frobenius operation has the advantage over a regular double operation in that it is faster and less expensive to execute.

During the execution of an algorithm of double-and-add type, the profile of the electric power consumption of device 100 differs according to whether the executed operation is a double operation or an add operation. An attack by simple power analysis may then enable an attacker to deduce the value, bit by bit, of the scalar k associated with the multiplication. In some embodiments, scalar k is a cipher key, which should thus remain secret.

In some embodiments, the scalar is an integer and is recoded in non-adjacent form (NAF). The NAF representation is based on a representation in signed digits (−1, 0, and 1) of the integer. The bits read during the execution of the algorithm are then not strictly speaking bits since their value is not restricted to 0 or 1. Under the NAF representation, the product of two consecutive digits ("bits") is zero, that is, each digit 1 or −1 is preceded and followed by a digit 0. An advantage with the NAF representation is that it enables to decrease the number of add operations to be performed since the proportion of non-zero digits is on average one third, compared with one half in binary representation.

In other embodiments, the scalar is recoded in non-adjacent windowed form of parameter w (NAFw), where parameter w is an integer greater than or equal to 2. The NAFw representation of parameter 2 corresponds to the NAF representation. In NAFw form, the digits coding the scalar have values in $\{-2^{w-1}, \ldots, 2^{w-1}\}$. Further, for each group of w consecutive digits, at most a single digit is non-zero. The NAFw representation of parameter w greater than or equal to 2 has the advantage of decreasing the number of non-zero digits coding the scalar, and accordingly of decreasing the number of add operations to be performed during a multiplication.

In the case of replacement of the double operation (DBL) by a Frobenius operation, the above expressions "non-adjacent form NAF" and "non-adjacent windowed form NAFw" have to be understood as non-adjacent τ-adic form and non-adjacent windowed τ-adic form.

Figure 2:
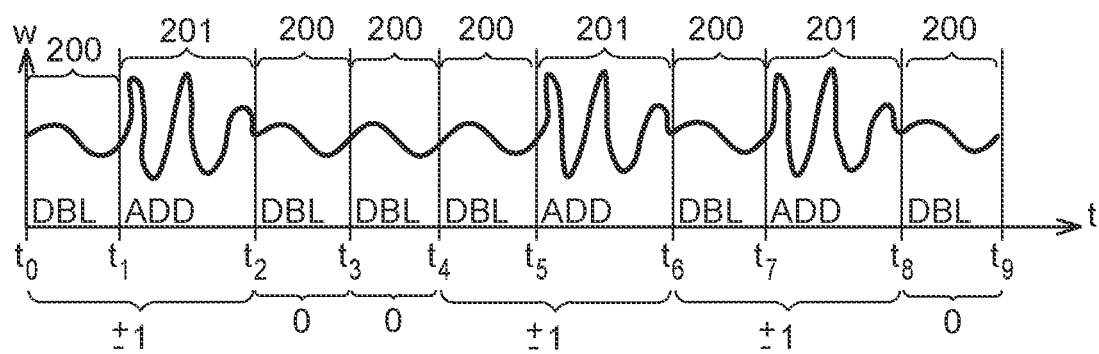
FIG. 2 is a graph illustrating an example of electric power consumption of the device illustrated in FIG. 1 during a cryptographic operation without implementing a protection of the cipher key.

FIG. 2 is a graph illustrating an example of electric power consumption of the device 100 illustrated in FIG. 1 during a cryptographic operation with no implementation of a protection of the cipher key.

The graph of FIG. 2 illustrates an example of the variation of the electric power consumption (axis of ordinates, W) over time (axis of abscissas, t) during the execution of an algorithm of double-and-add type applied to a point P of an elliptic curve and a scalar k in NAF form. The variation of the power consumption comprises a sequence formed of two patterns 200 and 201 respectively corresponding to the execution of a double operation (DBL) and of an add operation (ADD).

In the example illustrated in FIG. 2, double operations (DBL), identifiable by pattern 200, occur between times t0 and t1, t2 and t3, t3 and t4, t4 and t5, t6 and t7, and then t8 and t9. Add operations (ADD), identifiable by pattern 201, occur between times t1 and t2, t5 and t6, and then t7 and t8. When a double operation (DBL) is followed by an add operation (ADD), these two operations correspond to a non-zero digit (1 or −1) in the NAF representation of the scalar (k). Conversely, when a double operation (DBL) is followed by another double operation, the first double operation corresponds to a zero digit in the NAF representation of the scalar (k).

As illustrated by the power consumption variation in FIG. 2, it is possible for an attacker to deduce therefrom the performed operations, and thus the values of the key.

According to an embodiment and to make the profile of the electric power consumption of device 100 difficult to use during an attack, dummy operations are inserted in the sequence of operations. A dummy operation comprises the execution, for example, by cryptographic coprocessor 104, of one or a plurality of double and/or add operations without for these operations actually modifying a current value Q.

FIG. 3 is a table showing an example of insertion of dummy cryptographic operations. In the example of FIG. 3, the scalar (KEY) is shown in NAF form. Under this representation, a non-zero digit is always preceded and followed by a zero digit. In the example of FIG. 3, dummy operations are inserted so that the sequence (PATTERN) of operations, and thus the consumption profile per operation sequence, is always the same. The sequence is for example a sequence of two double operations (DBL) and of one addition (ADD). The scalar (KEY) is divided into groups of one or two digits, so that each non-zero digit is the second digit in a group 202 of two digits. Accordingly, each group 202 is of the form (0, 1) or (0, −1). To be able to still use the sequence of two double operations and of one addition, certain zero digits 203 are individually processed and others are processed in groups 204 of two zero digits. The operations (block 205) associated with groups 202 comprise no dummy operation. When a zero digit 203 is individually processed, one double operation and one add operation (block 206) are dummy operations. When two zero digits are processed by group 204, an add operation (block 207) is a dummy operation.

However, the dividing of the scalar (KEY) in group of digits of non-constant size enables an attacker, knowing the size of the scalar (KEY), to deduce the total number of individually processed zero digits (block 203) from the number of time the sequence of operations is executed.

Embodiments described hereafter enable to overcome all or part of the above-indicated disadvantages by dividing the scalar k into groups formed of a same number of digits.

For example, scalar k is in NAF form and is divided into a plurality of groups of two digits. For this specific case, the following table sums up, according to the values of the digits of the considered group, an example of the non-protected operations sequence, that is, the operations sequence executed with no insertion of dummy operations, and the protected operations sequence, that is, the operations sequence executed with the insertion of dummy operations according to the described embodiments to always have the same operation sequence. The dummy operations are indicated in brackets.

TABLE 1

| Possible pairs of digits | (0, 0) | (0, ±1) | (±1, 0) |
|---|---|---|---|
| Non-protected operation sequence | DBL DBL | DBL DBL ADD | DBL ADD DBL |
| Protected operation sequence (with dummy operations) | DBL (DBL) (ADD) DBL | DBL DBL ADD (DBL) | DBL (DBL) ADD DBL |

Other protected operation sequences can be envisaged. As an example, in the case of digit pair (0, 0), it is possible to make the add operation (ADD) and the last double operation (DBL) dummy operations, or also to make the first double operation (DBL) as well as the add operation (ADD) dummy operations.

According to an embodiment, for each pair of digits, at most two dummy operations are inserted. On average, one addition out of three is dummy and one double operation out of three is dummy.

According to an embodiment, the double operations (DBL) are replaced with Frobenius operations T when the considered elliptic curve is a Koblitz curve. In this case, the operation sequences are for example those indicated in the following table where the dummy operations are indicated in brackets:

TABLE 2

| Possible pairs of digits | (0, 0) | (0, ±1) | (±1, 0) |
|---|---|---|---|
| Protected operation sequence | $\tau\,(\tau^\tau)\,(ADD)\,\tau^\tau$ | $\tau^\tau\,ADD\,(\tau)$ | $\tau\,(\tau^\tau)\,ADD\,\tau$ |

According to another embodiment, the double operations (DBL) are replaced by any unitary operation on a point, provided this operation allows to multiplicate the point according to the "double and add" algorithm where the double operation is replaced by said operation and eventually after having converted the scalar k under an appropriate form.

Figure 4:
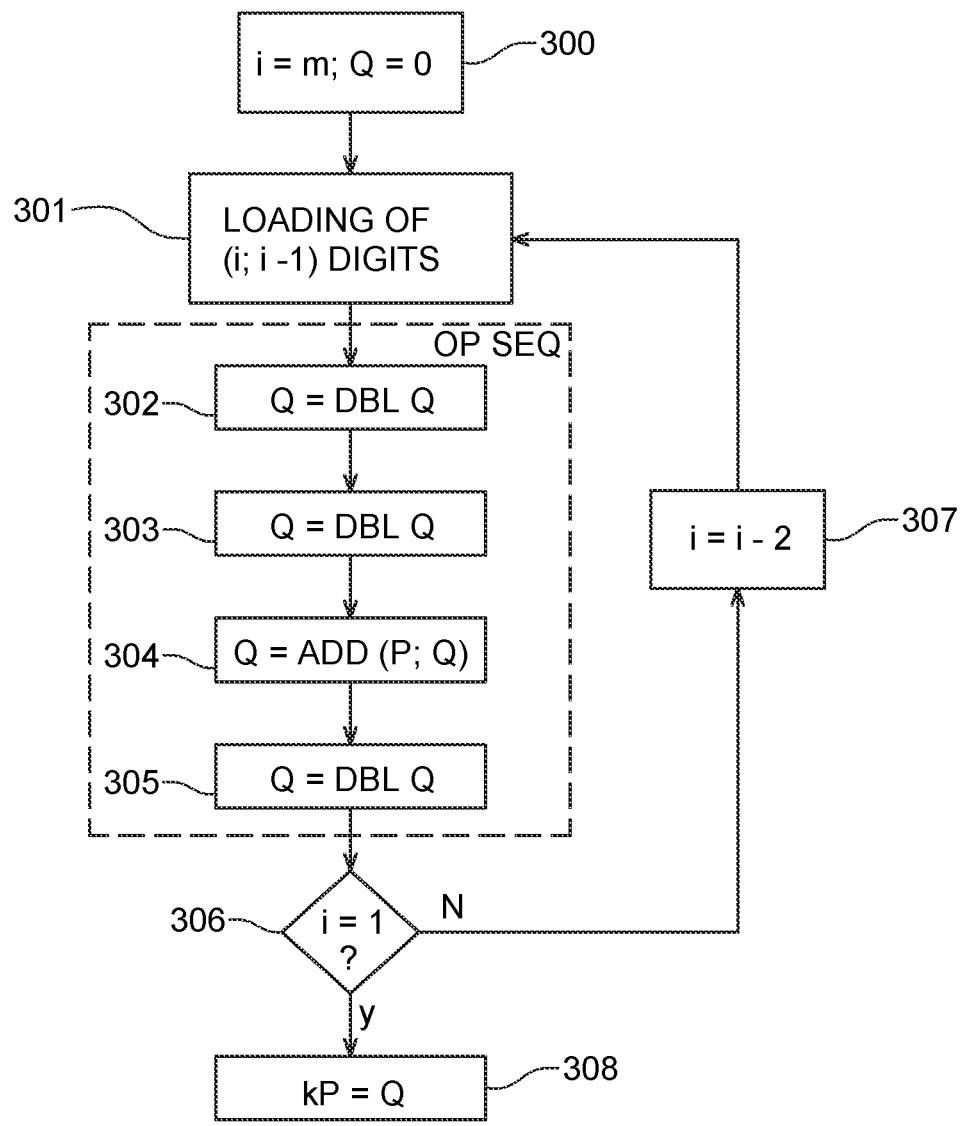
FIG. 4 is a flowchart illustrating operations of a method of implementation of a cryptographic operation according to an embodiment.

FIG. 4 is a flowchart illustrating operations of a method of implementation of an example of a cryptographic operation according to an embodiment. As an example, the method is implemented by the cryptographic coprocessor 104 of device 100.

More particularly, the cryptographic operation is a multiplication of a point P of an elliptic curve E by a scalar k in NAF form. The example of FIG. 4 is based on double operations, and scalar k is in NAF form and is divided into a plurality of groups of two digits.

In a step 300 (i=m; Q=0), variables of the algorithms are for example initialized. A current value Q is initialized at 0 and an incrementation value i is initialized at value m, m being for example the rank of the most significant digit of a scalar k. In this example, the rank of the least significant digit is value 0, but it is possible to consider that the value of the rank of the less significant digit is 1, or any other value.

In a step 301 (LOADING OF (i, i−1) DIGITS), subsequent to step 300, the two digits of rank i and i−1 are loaded, for example by cryptographic coprocessor 104, and then read. This enables cryptographic coprocessor 104, or processor 102, to determine what the dummy operations to be performed will be.

At steps 302 to 305, a sequence of operations (OP SEQ) is executed comprising, in the example of FIG. 4, double or add operations performed on current value Q. Current value Q is for example stored in a register (not shown) of the cryptographic coprocessor 104 of the device 100 of FIG. 1. Steps 302, 303, and 305 (Q=DBL Q) comprise double operations comprising adding current value Q to itself. Step 304 (Q=ADD(P;Q)) is an add operation comprising adding point P of curve E to current value Q. During steps 302 to 305, the current value Q stored in the register is for example only modified if the double or add operation is not a dummy operation. In the case of a dummy operation, the operation is for example executed, but the content of the register is not modified. In another embodiment, the dummy operation modifies the current value Q stored in the register, without impact the following operations. For example, the current value Q is modified so that the new value is a different form of the current value Q.

As an example, cryptographic coprocessor 104 verifies in a step 306 (i=1?), subsequent to step 305, whether value i is equal to 1. When value i is equal to 1 (branch Y), all the digits coding scalar k have been read and the method ends. The stored current value Q is the result of the multiplication of point P by scalar k (kP=Q, 308). When value i is different from 1 (branch N), i is decremented by two units (i=i−2, 307). For example, when value i is equal to initial value m, once steps 302 to 305 have been carried out, value i passes from value m to value m−2 in step 307. After step 307, the method resumes at step 302, with the new values i and Q.

Although FIG. 4 illustrates a method where the digits of scalar k are used from the most significant digit to the least significant digit, in other embodiments, the digits of scalar k are used from the least significant digit to the most significant digit. For example, in the cases of NAF and NAFw forms, the processing of digits is reversed. The digits are then considered by pairs or groups of the form (i−w+1, ..., i). The target of the double operation (DBL) then changes and the double operation (DBL) performs P=DBL(P). The order of operations 302 to 305 is then reversed.

When scalar k is coded in NAFw form with a parameter w greater than or equal to 3, the digits coding scalar k are read by group of size w.

The method then comprises consecutively executing w double operations, and then one add operation and (w−1) double operations, independently from the value of the digits forming the group. Certain (w−1 or w) of these operations are dummy operations. As an example, for a group of w zero digits, the add operation and w−1 double operations are dummy operations, for example, the w−1 first double operations are dummy operations.

Figure 5:
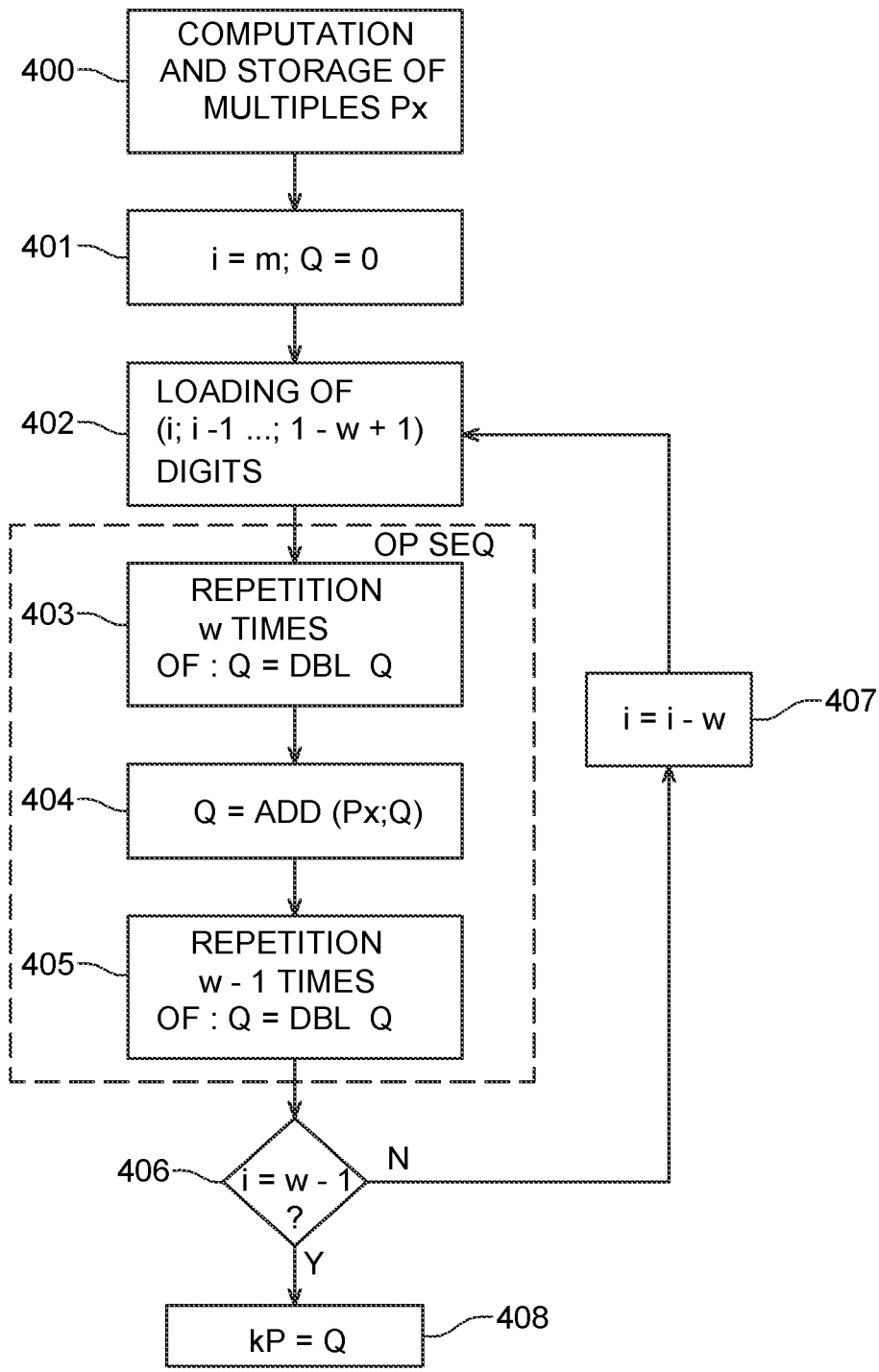
FIG. 5 is a flowchart illustrating operations of a method of implementation of a cryptographic operation according to another embodiment.

FIG. 5 is a flowchart illustrating operations of a method of implementation of an example of a cryptographic operation according to another embodiment.

More particularly, the cryptographic operation is a multiplication of a point P of an elliptic curve E by a scalar k in NAFw form with a parameter w greater than or equal to 3.

The method starts at a step 400 (COMPUTATION AND STORAGE OF MULTIPLES Px), where a plurality of multiples Px, x being a non-zero integer, of point P is calculated, for example, by cryptographic coprocessor 104 and in accordance with an arbitrary method, and is stored in a memory of device 100. For example, the plurality of multiples contains $(2^{w-1}-1)$ $(2^{w-1}-1)$ multiples of point P. In other embodiments, the plurality of multiples Px is already stored in memory 106 of device 100 and step 400 is then omitted. For example, if point P is constant, multiples Px are then stored in a non-volatile manner, for example in memory 106 if this memory is non-volatile, or in another memory. If point P is not constant, multiples Px are for example computed either for each multiplication, or uniquely when point P has changed since the last multiplication and are stored in a volatile memory or in a non-volatile memory.

A step 401 (i=m; Q=0) is the same algorithm initialization step as step 300 of FIG. 4.

In a step 402 (LOADING OF (i, i−1, ..., i−w+1) DIGITS), the w digits of rank i to i−w+1 are loaded, for example by cryptographic coprocessor 104, and then read. This enables, for example, cryptographic coprocessor 104 to determine which of the operations to be performed will be dummy operations.

At steps 403 to 405, a sequence of operations (OP SEQ) comprising double (DBL) and add (ADD) operations is performed on current value Q.

At step 403 (REPETITION OF w TIMES Q=DBL Q), subsequent to step 402, a succession of w double operations (DBL) is carried out, for example, by the cryptographic coprocessor (104), on current value Q. Some of these operations are dummy operations, and after their execution, current value Q, stored for example in a register of device 100, is not modified or is modified to an equivalent mathematical form.

At step 404 (Q=ADD(Px,Q), subsequent to step 403, an add operation is executed on current value Q. In the case where this operation is a dummy operation, after its execution, current value Q, stored for example in a register of device 100, is not modified or is modified to an equivalent mathematical form. The add operation is a dummy operation only in the case where the w digits of the digit group all have a zero value.

At step 405 (REPETITION OF w−1 TIMES Q=DBL Q), subsequent to step 404, a succession of (w−1) double operations (DBL) is carried out, for example, by the cryptographic coprocessor (104), on current value Q. Some of these operations are dummy and after their execution, current value Q, stored for example in the register of device 100, is not modified or is modified to an equivalent mathematical form.

As an example, cryptographic coprocessor 104 verifies at a step 406 (i=w−1?), subsequent to step 405, whether value i is equal to (w−1). When value i is equal to (w−1) (branch Y), all the digits coding scalar k have been read and the method ends. The current value Q stored in the register is the result of the multiplication of point P by scalar k (kP=Q, 408). When value i is different from w−1 (branch N), it is decremented by w units (i=i−w, 407). For example, when value i is equal to initial value m, once steps 403 to 405 have been carried out, value i passes from value m to value m−w at step 407. After step 407, the method resumes at step 402, with the new current values i and Q.

According to an embodiment, device 100 contains a volatile or non-volatile memory having a sufficient size for the storage of the multiples of point P calculated during step 400.

According to an embodiment, the double operations (DBL) are replaced with Frobenius operations when the considered elliptic curve is a Koblitz curve.

According to an embodiment, for each group of w digits, at most w dummy operations are inserted. On average, one add operation out of w+1 is dummy and w−1 double operations out of 2w−1 are dummy.

Figure 6:
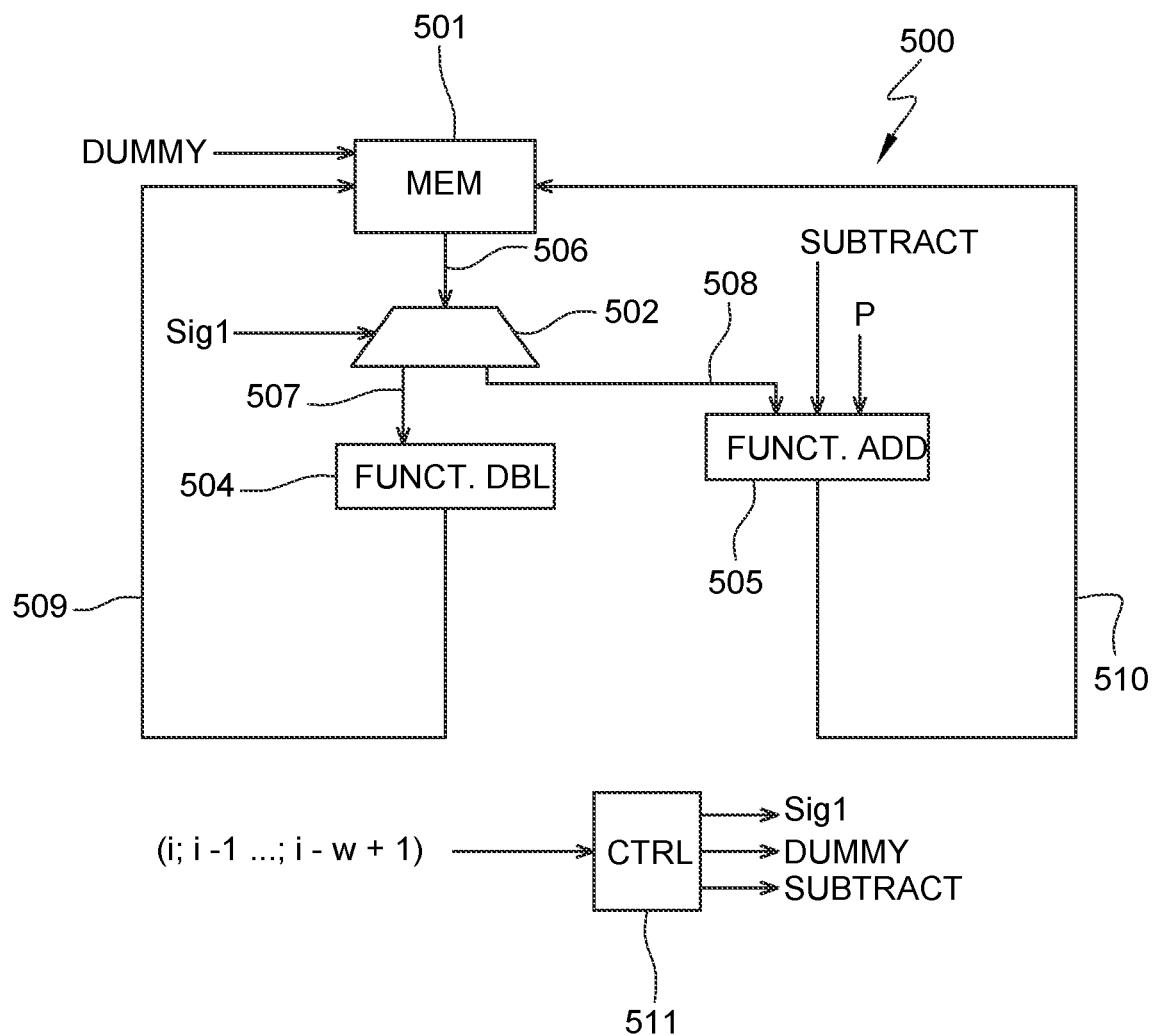
FIG. 6 schematically shows a calculation circuit according to an embodiment.

FIG. 6 schematically shows a calculation circuit 500, for example contained in cryptographic coprocessor 104, according to an embodiment.

Calculation circuit 500 comprises a memory 501 (MEM). Memory 501 is for example a register having current value Q stored therein.

Memory 501 transmits current value Q via a data bus 506 to a demultiplexer 502. Demultiplexer 502 is controlled by a signal Sig1. According to the value of signal Sig1, current value Q is sent either over a data bus 507, or over another data bus 508.

The current value Q is transmitted over bus 507 to a sequence of arithmetical and logical operators 504 (FUNCT. DBL) implementing the double operation or the Frobenius operation if the considered elliptic curve is a Koblitz curve, of current value Q. This operations sequence for example involves the storage of intermediary values necessary for the computation, for example in temporary registers not shown.

Calculation unit 500 further comprises a control circuit 511 (CTRL).

The current value Q is transmitted over bus 508 to an adder 505 (FUNCT. ADD). Adder 505 applies the add operation described in relation with FIGS. 3 and 4 to the current value Q. The adder 505 for example involves the storage of intermediary values necessary to the computation, for example in the temporary registers. In certain cases, one or more of multiples Px can be negative and the operation can be performed by subtracting the opposite value of Px from the current value Q. In order to perform subtractions, either adder 505 is configured to perform subtraction operations on the order of a signal SUBTRACT, provided by the control circuit 511, either a subtractor is added in parallel with the adder and the double operator 504.

Double operator 504 and adder 505 are coupled to memory 501, respectively, via data buses 509 and 510.

The overwriting of the value Q previously stored in memory 501 is controlled, for example, by a signal DUMMY. As an example, when the operation previously performed on current value Q is a dummy operation, signal DUMMY controls the holding of the old stored value Q in memory 501 and when the operation previously performed is not a dummy operation, signal DUMMY controls the overwriting of the old stored value Q and the storage of the new current value Q.

According to another embodiment, instead of modify the writing operation, signal DUMMY controls the functioning of double operator 504 and/or adder 505 to make their effect null.

Control circuit 511 is for example configured to generate and transmit signals Sig1 and DUMMY, for example, according to the digits of scalar k of indexes (i, i−1, . . . , i−w+1). In the case of a processing by windowed form NAFw of parameter higher than 2, the control circuit 511 further generates an address of memory 501 at which one of the precomputed points, used for the current computation, is stored, this point being for example the multiple Px or its opposite.

An advantage of the described embodiments is that they render it more difficult to exploit simple power analysis. Indeed, by dividing a scalar into a plurality of groups formed of a same number of digits, and by executing for each group of digits a same sequence of operations, the electric power consumption profile for each sequence remains the same, independently of the characteristics of the key.

Another advantage of the described embodiments is that few add operations performed are dummy. For example, in NAF representation, on average, only one addition out of three is dummy. Likewise, few double operations performed are dummy. For example, in NAF representation, one double operation out of three is dummy. In the case of Koblitz curves, the double operations are replaced by Frobenius operations, which consume little execution time.

Various embodiments and variants have been described. Those skilled in the art will understand that certain features of these various embodiments and variants may be combined, and other variants will occur to those skilled in the art. In particular, calculation circuit configurations other than the circuit shown in FIG. 6 would enable the methods described in relation with FIGS. 4 and 5 to be implemented.

Finally, the practical implementation of the described embodiments and variations is within the abilities of those skilled in the art based on the functional indications given hereabove. In particular, regarding the insertion of the dummy operations.

One embodiment provides a cryptographic method comprising:
  multiplying a point belonging to a mathematical set with a group structure by a scalar by performing:
    the division of a scalar into a plurality of groups formed of a same number w of digits, w being greater than or equal to 2; and
    the execution, by a cryptographic circuit and for each group of digits, of a sequence of operations on point (P), the sequence of operations being identical for each group of digits, at least one of the operations executed for each of the groups of digits being a dummy operation.

One embodiment provides cryptographic circuit for performing a multiplication of a point belonging to a mathematical set with a group structure by a scalar, the cryptographic circuit being configured to:
  divide a scalar into a plurality of groups formed of a same number w of digits, w being greater than or equal to 2;
  executing, for each group of digits, a sequence of operations on point, the sequence of operations being identical for each group of digits, at least one of the operations executed for each of the groups of digits being a dummy operation.

According to an embodiment, the sequence of operations comprises:
  a) the execution, w times, of a first operation;
  b) the execution of a second operation; and
  c) the execution, (w−1) times, of the first operation.

According to an embodiment, the first operation is a double operation and the second operation is an add operation.

According to an embodiment, the cryptographic circuit is configured to modify a current value of an intermediate result of the multiplication after each non-dummy operation and to not modify this current value after each dummy operation.

According to an embodiment, for each dummy operation, the cryptographic circuit is configured to modify a current value of an intermediate result of the multiplication in a different but mathematically equivalent value.

According to an embodiment, the process or the circuit further comprises, before the division into a plurality of groups of digits, the re-encoding of the scalar in non-adjacent windowed form of parameter w.

According to an embodiment, the mathematical set is an elliptic curve or an hyperelliptic curve.

According to an embodiment, the curve is a Koblitz curve defined by a set of points and having the following form:

$$\{(x,y) \in K \times K : y^2 + xy = x^3 + ax^2 + 1\} \quad \text{Math 1}$$

where a is equal to 0 or 1 and K is a finite binary field.

According to an embodiment, the double operation is a Frobenius endomorphism.

According to an embodiment, the process or the circuit further comprises, before the execution of the operation sequence on point, the calculation and the storage into a memory of the circuit of a plurality of multiples of said point.

One embodiment provides a non-transient memory storing instructions for the implementation of the method when these instructions are executed by a cryptographic processor.

One embodiment provides an electronic device comprising a cryptographic circuit configured to implement the method.

In an embodiment, a method comprises: multiplying, using cryptographic circuitry, a point, belonging to a mathematical set with a group structure, by a scalar; and protecting, using the cryptographic circuitry, the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation. In an embodiment, the same sequence of operations comprises: a) the execution, w times, of a first operation; b) the execution of a second operation; and c) the execution, (w−1) times, of the first operation. In an embodiment, the first operation is a double operation and the second operation is an add operation. In an embodiment, the method comprises: modifying a current value of an intermediate result of the multiplication in response to each non-dummy operation; and not modifying the current value in response to a dummy operation. In an embodiment, the method comprises: modifying a current value of an intermediate result of the multiplication in response to each non-dummy operation; and modifying the current value to a different, mathematically equivalent value in response to a dummy operation. In an embodiment, the method comprises, before the division into a plurality of groups of digits, re-encoding of the scalar in a non-adjacent windowed form of parameter w. In an embodiment, the mathematical set is an elliptic curve or an hyperelliptic curve. In an embodiment, the curve is a Koblitz curve defined by a set of points and having the following form:

$$\{(x,y) \in K \times K : y^2 + xy = x^3 + ax^2 + 1\}$$

where a is equal to 0 or 1, K is a finite binary field, and x and y define coordinates of a point on the Koblitz curve. In an embodiment, the sequence of operations includes a Frobenius endomorphism in place of the double operation. In an embodiment, the method comprises, before the execution of the sequence of operations on point, the calculation and the storage of a plurality of multiples of said point. In an embodiment, the method comprising generating a result of the multiplication of the point by the scalar based on the execution of the sequences of operation for the plurality of digits.

In an embodiment, a device comprises: a memory; and cryptographic circuitry coupled to the memory. The cryptographic circuitry, in operation, multiplies a point by a scalar, the point belonging to a mathematical set with a group structure, and protects the scalar during the multiplying, the multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation. In an embodiment, the same sequence of operations comprises: the execution, w times, of a first operation; the execution of a second operation; and the execution, w−1 times, of the first operation. In an embodiment, the first operation is a double operation and the second operation is an add operation. In an embodiment, the multiplying and protecting includes: modifying a current value of an intermediate result of the multiplication in response to each non-dummy operation; and not modifying the current value of the intermediate result in response to a dummy operation. In an embodiment, the multiplying and protecting includes: modifying a current value of an intermediate result of the multiplication in response to each non-dummy operation; and modifying the current value of the intermediate result to a different, mathematically equivalent value in response to a dummy operation. In an embodiment, the multiplying and protecting includes, before the division into a plurality of groups of digits, re-encoding of the scalar in a non-adjacent windowed form of parameter w. In an embodiment, the mathematical set is an elliptic curve or an hyperelliptic curve.

In an embodiment, a system comprises: a host processor; and a cryptographic coprocessor coupled to the host processor, wherein the cryptographic coprocessor, in operation, multiplies a point by a scalar, the point belonging to a mathematical set with a group structure, and protects the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation. In an embodiment, the multiplying and protecting includes, before the division into a plurality of groups of digits, re-encoding of the scalar in a non-adjacent windowed form of parameter w. In an embodiment, the mathematical set is an elliptic curve or an hyperelliptic curve. In an embodiment, the curve is a Koblitz curve defined by a set of points and having the following form:

$$\{(x,y) + \in K \times K : y^2 + xy = x^3 + ax^2 + 1\}$$

where a is equal to 0 or 1, K is a finite binary field, and x and y define coordinates of a point on the Koblitz curve.

In an embodiment, a non-transitory computer-readable medium has contents which configure cryptographic circuitry to multiply a point by a scalar, the point belonging to a mathematical set with a group structure, and protect the scalar during the multiplying. The multiplying and protecting including: dividing the scalar into a plurality of groups formed of a same number w of digits, w being greater than or equal to 2; and executing, for each group of digits, of a sequence of operations on the point, the sequence of operations having a same sequence for each group of digits, at least one of the operations executed for each of the groups of digits being a dummy operation. In an embodiment, the contents comprise instructions executed by the cryptographic circuitry. In an embodiment, the multiplying and protecting includes, before the division into a plurality of groups of digits, re-encoding of the scalar in a non-adjacent windowed form of parameter w.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   executing an application invoking a cryptographic operation; and
   performing the invoked cryptographic operation, the performing the invoked cryptographic operation including:
      multiplying, using cryptographic circuitry, a point, belonging to a mathematical set with a group structure, by a scalar; and
      protecting, using the cryptographic circuitry, the scalar during the multiplying, the multiplying and protecting including:
         dividing the scalar into a plurality of groups formed of a same number w of digits, w being greater than or equal to 2; and
         executing, for each group of digits, of a sequence of operations on the point, the sequence of operations having a same sequence for each group of digits, at least one of the operations executed for each of the groups of digits being a dummy operation,
   wherein the same sequence of operations comprises:
      the execution, w times, of a double operation;
      the execution of an add operation; and
      the execution, (w−1) times, of the double operation.

2. The method according to claim 1, comprising:
modifying a current value of an intermediate result of the multiplication in response to each non-dummy operation; and
not modifying the current value in response to a dummy operation.

3. The method according to claim 1, comprising:
modifying a current value of an intermediate result of the multiplication in response to each non-dummy operation; and
modifying the current value to a different, mathematically equivalent value in response to a dummy operation.

4. The method according to claim 1, comprising, before the division into a plurality of groups of digits, re-encoding of the scalar in a non-adjacent windowed form of parameter w.

5. The method according to claim 1, wherein the mathematical set is an elliptic curve or an hyperelliptic curve.

6. The method according to claim 5, wherein the curve is a Koblitz curve defined by a set of points having the following form:

$$\{(x,y) \in K \times K : y^2 + xy = x^3 + ax^2 + 1\}$$

where a is equal to 0 or 1, K is a finite binary field, and x and y define coordinates of a point on the Koblitz curve.

7. The method according to claim 6, wherein the sequence of operations includes a Frobenius endomorphism.

8. The method according to claim 1, comprising, before the execution of the sequence of operations on the point, calculation and storage of a plurality of multiples of said point.

9. The method of claim 1, comprising:
generating a result of the multiplication of the point by the scalar based on the execution of the sequences of operation for the plurality of groups of digits.

10. The method of claim 1, wherein the invoked cryptographic operation is an authentication operation.

11. A device, comprising:
a memory; and
cryptographic circuitry coupled to the memory, wherein the cryptographic circuitry, in operation, in response to a request from an application, executes a cryptographic operation, the executing the cryptographic operation including multiplying a point by a scalar, the point belonging to a mathematical set with a group structure, and protecting the scalar during the multiplying, the multiplying and protecting including:
dividing the scalar into a plurality of groups formed of a same number w of digits, w being greater than or equal to 2; and
executing, for each group of digits, of a sequence of operations on the point, the sequence of operations having a same sequence for each group of digits, at least one of the operations executed for each of the groups of digits being a dummy operation,
wherein the same sequence of operations comprises:
the execution, w times, of a double operation;
the execution of an add operation; and
the execution, w−1 times, of the double operation.

12. The device according to claim 11, wherein the multiplying and protecting includes:
modifying a current value of an intermediate result of the multiplication in response to each non-dummy operation; and
not modifying the current value of the intermediate result in response to a dummy operation.

13. The device according to claim 11, wherein the multiplying and protecting includes:
modifying a current value of an intermediate result of the multiplication in response to each non-dummy operation; and
modifying the current value of the intermediate result to a different, mathematically equivalent value in response to a dummy operation.

14. The device according to claim 11, wherein the multiplying and protecting includes, before the division into a plurality of groups of digits, re-encoding of the scalar in a non-adjacent windowed form of parameter w.

15. The device according to claim 11, wherein the mathematical set is an elliptic curve or an hyperelliptic curve.

16. The device according to claim 11, wherein the cryptographic circuitry, in operation, generates a result of the multiplication of the point by the scalar based on the execution of the sequences of operation for the plurality of groups of digits.

17. The device of claim 11, wherein the request from the application is an authentication request.

18. A system, comprising:
a host processor, which, in operation, executes an application; and
a cryptographic coprocessor coupled to the host processor, wherein the cryptographic coprocessor, in operation, performs a cryptographic operation in response to a request from the application, the performing the cryptographic operation including multiplying a point by a scalar, the point belonging to a mathematical set with a group structure, and protecting the scalar during the multiplying, the multiplying and protecting including:
dividing the scalar into a plurality of groups formed of a same number w of digits, w being greater than or equal to 2; and
executing, for each group of digits, of a sequence of operations on the point, the sequence of operations having a same sequence for each group of digits, at least one of the operations executed for each of the groups of digits being a dummy operation,
wherein the same sequence of operations comprises:
the execution, w times, of a double operation;
the execution of an add operation; and
the execution, w−1 times, of the double operation.

19. The system of claim 18, wherein the multiplying and protecting includes, before the division into a plurality of groups of digits, re-encoding of the scalar in a non-adjacent windowed form of parameter w.

20. The system according to claim 18, wherein the mathematical set is an elliptic curve or an hyperelliptic curve.

21. The system according to claim 20, wherein the curve is a Koblitz curve defined by a set of points having the following form:

$$\{(x,y) \in K \times K : y^2 + xy = x^3 + ax^2 + 1\}$$

where a is equal to 0 or 1, K is a finite binary field, and x and y define coordinates of a point on the Koblitz curve.

22. The system according to claim 18, wherein the cryptographic coprocessor, in operation, generates a result of the multiplication of the point by the scalar based on the execution of the sequences of operation for the plurality of groups of digits.

23. A non-transitory computer-readable medium having contents which configure cryptographic circuitry to perform a cryptographic operation in response to a request from an application, the performing the cryptographic operation including:
- multiplying a point by a scalar, the point belonging to a mathematical set with a group structure; and
- protecting the scalar during the multiplying, the multiplying and protecting including:
  - dividing the scalar into a plurality of groups formed of a same number w of digits, w being greater than or equal to 2; and
  - executing, for each group of digits, of a sequence of operations on the point, the sequence of operations having a same sequence for each group of digits, at least one of the operations executed for each of the groups of digits being a dummy operation,
- wherein the same sequence of operations comprises:
  - the execution, w times, of a double operation;
  - the execution of an add operation; and
  - the execution, w−1 times, of the double operation.

24. The non-transitory computer-readable medium of claim 23, wherein the contents comprise instructions executed by the cryptographic circuitry.

25. The non-transitory computer-readable medium of claim 23, wherein the multiplying and protecting includes, before the division into a plurality of groups of digits, re-encoding of the scalar in a non-adjacent windowed form of parameter w.

26. The non-transitory computer-readable medium according to claim 23, wherein the multiplying and protecting comprises generating a result of the multiplication of the point by the scalar based on the execution of the sequences of operation for the plurality of groups of digits.

* * * * *